US012757095B2

(12) United States Patent
Damnjanovic et al.

(10) Patent No.: US 12,757,095 B2
(45) Date of Patent: Oct. 6, 2026

(54) LOWER LAYER TRIGGERED MOBILITY-BASED RADIO LINK FAILURE OPERATIONS

(71) Applicant: QUALCOMM Incorporated, San Diego, CA (US)

(72) Inventors: Jelena Damnjanovic, Del Mar, CA (US); Tao Luo, San Diego, CA (US); Naeem Akl, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 18/521,630

(22) Filed: Nov. 28, 2023

(65) Prior Publication Data

US 2024/0179602 A1 May 30, 2024

Related U.S. Application Data

(60) Provisional application No. 63/385,527, filed on Nov. 30, 2022.

(51) Int. Cl.

*H04W 36/30* (2009.01)
*H04W 36/00* (2009.01)
*H04W 36/08* (2009.01)

(52) U.S. Cl.

CPC ..... *H04W 36/305* (2018.08); *H04W 36/0058* (2018.08); *H04W 36/08* (2013.01)

(58) Field of Classification Search

CPC ........... H04W 36/305; H04W 36/0058; H04W 36/08; H04W 36/0079; H04W 36/362

See application file for complete search history.

(56) References Cited

U.S. PATENT DOCUMENTS

| | | | | |
|---|---|---|---|---|
| 2022/0131793 A1* | 4/2022 | Ramachandra | ......... | H04L 45/44 |
| 2023/0388871 A1* | 11/2023 | Guo | .................. | H04W 36/0069 |

OTHER PUBLICATIONS

CMCC: "Considerations on Characteristics and Scenarios", 3GPP TSG-RAN WG2 Meeting #120, R2-2212706, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, pp. 1-4, XP052216775, Chapter 2 Discussion.

(Continued)

*Primary Examiner* — Joseph E Dean, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell. The UE may perform an RLF operation based on the set of LTM-based RLF conditions. Numerous other aspects are described.

30 Claims, 10 Drawing Sheets

(56) References Cited

OTHER PUBLICATIONS

Ericsson: "Rrc Aspects of L1/L2 Based Inter-cell Mobility", 3GPP TSG-RAN WG2 #119-bis-e, R2-2210333, 3rd Generation Partnership Project, Mobile Competence Centre, 650, Route Des Lucioles, F-06921 Sophia-Antipolis Cedex, France, vol. RAN WG2, No. Electronic meeting, Oct. 10, 2022-Oct. 19, 2022, Sep. 30, 2022, 7 Pages, XP052263655, Section 2.4, Chapter 2.1 Configuration aspects for LI/L2 inter-cell mobility, Chapter 2.3 RLM and RLF handling.

International Search Report and Written Opinion—PCT/US2023/081552—ISA/EPO—Apr. 11, 2024.

Nokia., et al., "Basic Details of Lower Layer Mobility", 3GPP TSG-RAN WG2 Meeting #119 Electronic, R2-2208213, 3rd Generation Partnership Project, Mobile Competence Centre, 650, Route Des Lucioles, F-06921 Sophia-Antipolis Cedex, France, vol. RAN WG2, No. Electronic, Aug. 17, 2022-Aug. 26, 2022, Aug. 10, 2022, XP052261524, 12 Pages, Chapter 3.2 RLF and Handover Failure in LLM.

Qualcomm Incorporated: "L1/L2 Mobility-General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, Aug. 8, 2022, 6 Pages, XP052260662, Chapter 2. L1/L2 Inter-cell Mobility Schemes.

* cited by examiner

LOWER LAYER TRIGGERED MOBILITY-BASED RADIO LINK FAILURE OPERATIONS

CROSS-REFERENCE TO RELATED APPLICATION

This Patent Application claims priority to U.S. Provisional Patent Application No. 63/385,527, filed on Nov. 30, 2022, entitled "LOWER LAYER TRIGGERED MOBILITY-BASED RADIO LINK FAILURE OPERATIONS," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for lower layer triggered mobility-based radio link failure operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include one or more memories and one or more processors coupled to the one or more memories. The one or more processors may be configured, individually or in any combination, to cause the UE to receive configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell. The one or more processors may be configured to cause the UE to perform an RLF operation based on the set of LTM-based RLF conditions.

Some aspects described herein relate to a network node for wireless communication. The network node may include one or more memories and one or more processors coupled to the one or more memories. The one or more processors may be configured, individually or in any combination, to cause the network node to transmit configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. The one or more processors may be configured to cause the network node to receive an RLF indication based on the set of LTM-based RLF conditions.

Some aspects described herein relate to a method of wireless communication performed by a UE. The method may include receiving configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. The method may include performing an RLF operation based on the set of LTM-based RLF conditions.

Some aspects described herein relate to a method of wireless communication performed by a network node. The method may include transmitting configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. The method may include receiving an RLF indication based on the set of LTM-based RLF conditions.

Some aspects described herein relate to a non-transitory computer-readable medium that stores a set of instructions for wireless communication by a UE. The set of instructions, when executed by one or more processors of the UE, may cause the UE to receive configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. The set of instructions, when executed by one or more processors of the UE, may cause the UE to perform an RLF operation based on the set of LTM-based RLF conditions.

Some aspects described herein relate to a non-transitory computer-readable medium that stores a set of instructions for wireless communication by a network node. The set of instructions, when executed by one or more processors of the network node, may cause the network node to transmit configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. The set of instructions, when executed by one or more processors of the network node, may cause the network node to receive an RLF indication based on the set of LTM-based RLF conditions.

Some aspects described herein relate to an apparatus for wireless communication. The apparatus may include means for receiving configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. The apparatus may include means for performing an RLF operation based on the set of LTM-based RLF conditions.

Some aspects described herein relate to an apparatus for wireless communication. The apparatus may include means for transmitting configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. The apparatus may include means for receiving an RLF indication based on the set of LTM-based RLF conditions.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
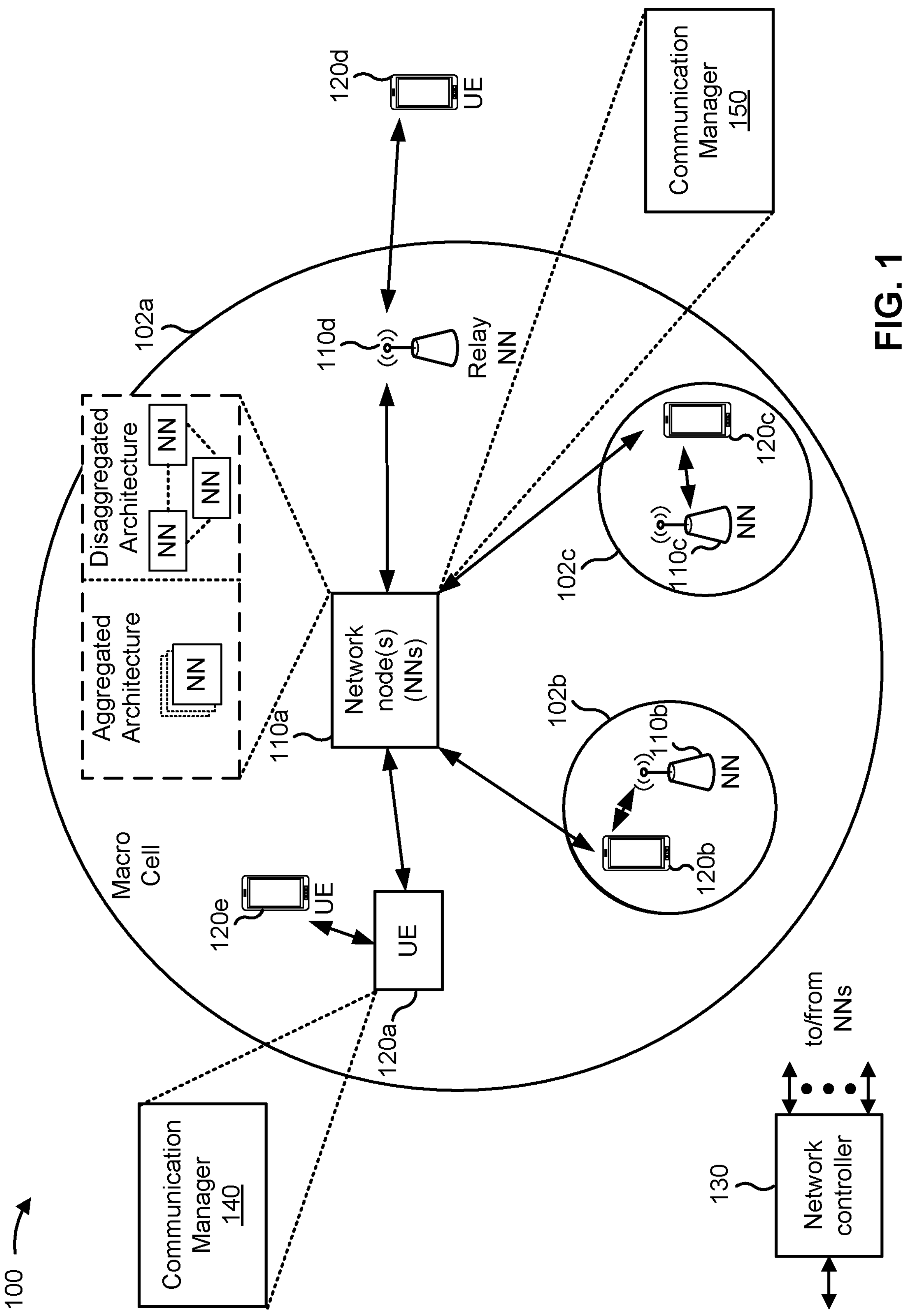
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell; and perform an RLF operation based on the set of LTM-based RLF conditions. Additionally, or alternatively, the communication manager 140 may perform one or more other operations described herein.

In some aspects, the network node 110 may include a communication manager 150. As described in more detail elsewhere herein, the communication manager 150 may transmit configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell; and receive an RLF indication based on the set of LTM-based RLF conditions. Additionally, or alternatively, the communication manager 150 may perform one or more other operations described herein.

As indicated above, FIG. 1 is provided as an example. Other examples may differ from what is described with regard to FIG. 1.

Figure 2:
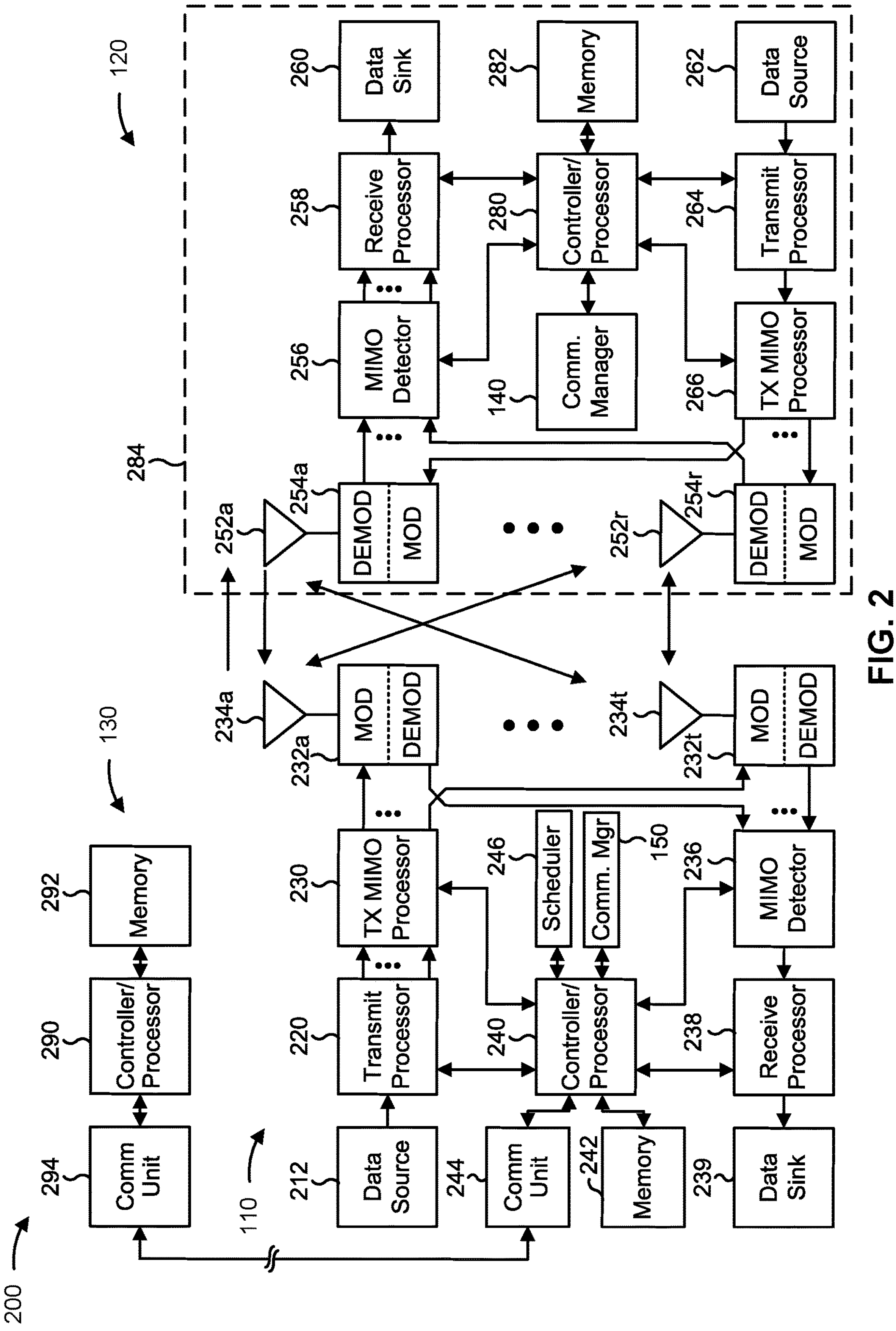
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 220, TX MIMO processor 230, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with LTM-based RLF operations, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) may include means for receiving configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell; and/or means for performing an RLF operation based on the set of LTM-based RLF conditions. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) may include means for transmitting configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell; and/or means for receiving an RLF indication based on the set of LTM-based RLF conditions. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
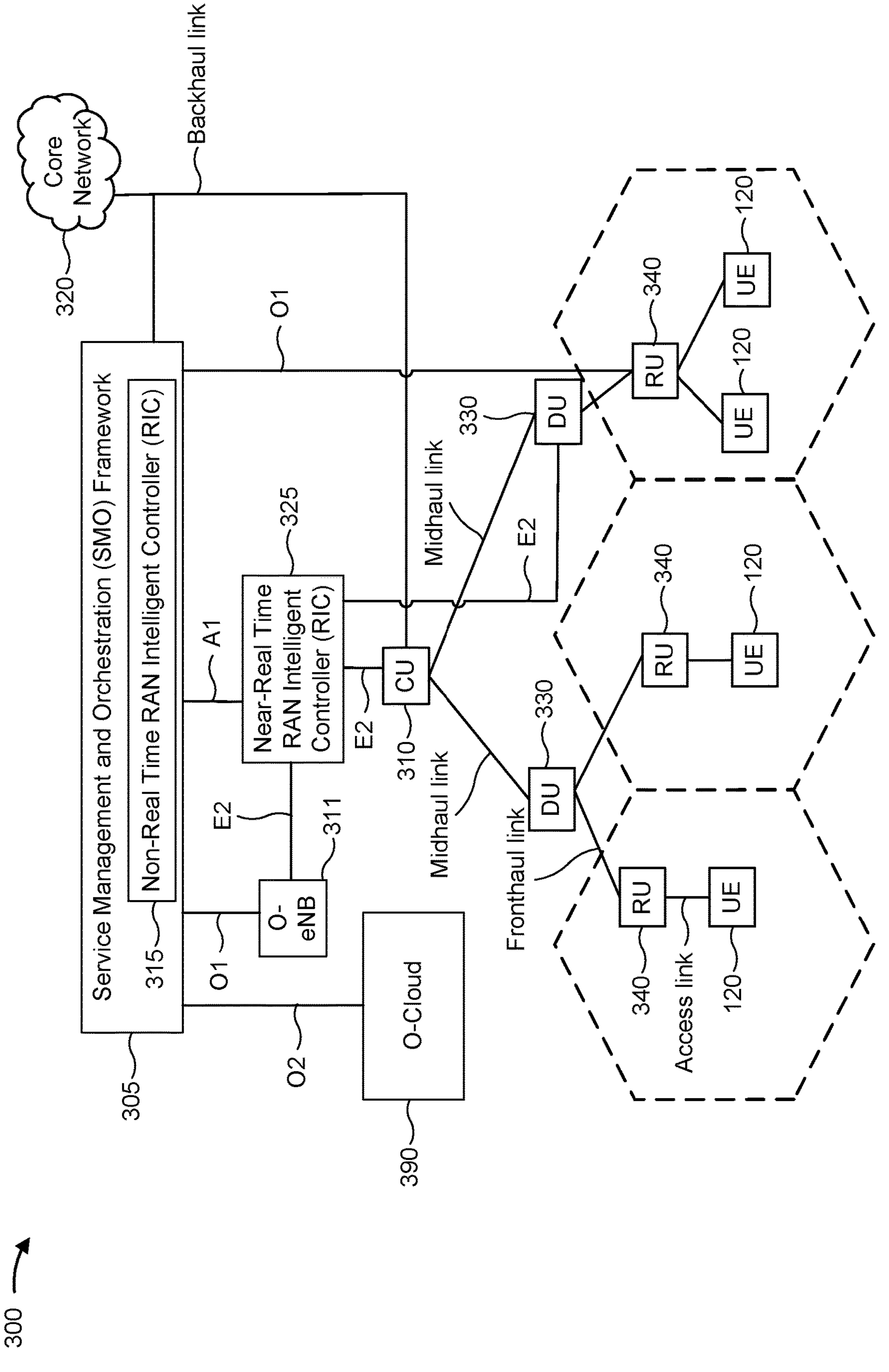
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-cNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A UE and a network node may perform a handover (sometimes abbreviated HO) to switch a primary serving cell of the UE from a source cell to a target cell. Handover can be triggered by a UE (such as by transmitting a measurement report identifying a suitable target cell) or a network node (such as based at least in part on a load condition at the source cell and/or the target cell). Handover generally involves some amount of delay due to the signaling involved, such as the UE transmitting a measurement report, the network node determining whether to proceed with a handover based at least in part on the measurement report, and the signaling associated with handing the UE over to the target cell.

In a wireless network, such as an NR network, a UE and a network node (e.g., a base station or one or more units or components performing base station functionality) may communicate on an access link using directional links (e.g., using high-dimensional phased arrays) to benefit from a beamforming gain and/or to maintain acceptable communication quality. The directional links, however, typically require fine alignment of transmit and receive beams, which may be achieved through a set of operations referred to as beam management and/or beam selection, among other examples. Further, a wireless network may support multi-beam operation in a relatively high carrier frequency (e.g., within FR2), which may be associated with harsher propagation conditions than comparatively lower carrier frequencies. For example, relative to a sub-6 gigahertz (GHz) band, signals propagating in a millimeter wave frequency band may suffer from increased pathloss and severe channel intermittency, and/or may be blocked by objects commonly present in an environment surrounding the UE (e.g., a building, a tree, and/or a body of a user, among other examples). Accordingly, beam management is particularly important for multi-beam operation in a relatively high carrier frequency.

One possible enhancement for multi-beam operation in a higher carrier frequency is facilitation of efficient (e.g., low latency and low overhead) downlink and/or uplink beam management to support lower layer triggered mobility (LTM) (e.g., layer 1 and/or layer 2 (L1/L2) inter-cell mobility). In some cases, LTM can enable a UE to perform a cell switch via dynamic control signaling at lower layers (e.g., DCI for L1 signaling or a medium access control (MAC) control element (MAC CE) for L2 signaling) rather than semi-static Layer 3 (L3) RRC signaling in order to reduce latency, reduce overhead, and/or otherwise increase efficiency of the cell switch.

Figure 4A:
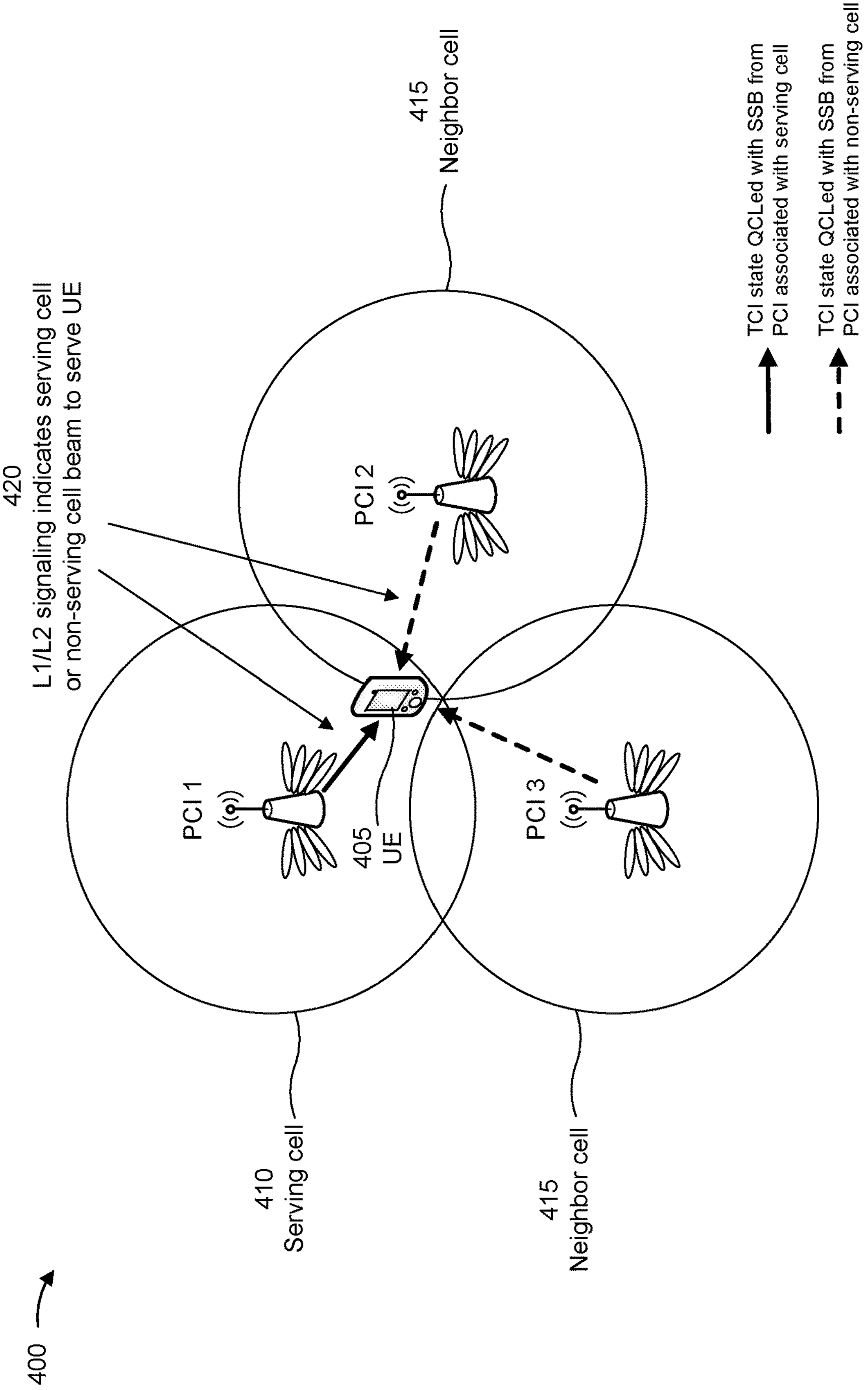
FIG. 4A illustrates an example of a first lower layer triggered mobility (LTM) technique, in accordance with the present disclosure.

FIG. 4A illustrates an example 400 of a first LTM technique, in accordance with the present disclosure. The first LTM technique may be referred to as inter-cell mobility scheme 1, beam-based inter-cell mobility, dynamic point selection based inter-cell mobility, and/or non-serving cell-based inter-cell mobility, among other examples. As described in further detail herein, the first LTM technique may enable a network node to use L1 signaling (e.g., DCI) or L2 signaling (e.g., a medium access control (MAC) control element (MAC CE)) to indicate that a UE 405 is to communicate on an access link using a beam from a serving cell or a non-serving cell. For example, in a wireless network where LTM is not supported (e.g., cell switches are triggered only by an L3 handover), beam selection for control information and for data is typically limited to beams within a physical cell identifier (PCI) associated with a serving cell. In contrast, in a wireless network that supports the first LTM technique (e.g., as shown in FIG. 4A), beam selection for control and data may be expanded to include any beams within a serving cell 410 or one or more non-serving neighbor cells 415 configured for LTM.

For example, in the first LTM technique shown in FIG. 4A, a UE 405 may be configured with a single serving cell 410, and the UE 405 may be further configured with a neighbor cell set that includes one or more non-serving cells 415 configured for LTM. In general, the serving cell 410 and the non-serving cells 415 that are configured for LTM may be associated with a common CU and a common DU, or the serving cell 410 and the non-serving cells 415 configured for LTM may be associated with a common CU and different DUs. In some aspects, as shown by reference number 420, a base station may trigger LTM for a UE using L1/L2 signaling (e.g., DCI or a MAC-CE) that indicates a selected TCI state QCLed with a reference signal (e.g., a synchronization signal block (SSB)) associated with a PCI. For example, in FIG. 4A, the UE may be communicating with the serving cell 410 using a TCI state that is QCLed with an SSB from a PCI associated with the serving cell 410 (e.g., shown as PCI 1 in FIG. 4A), and lower layer (e.g., L1/L2) signaling may trigger inter-cell mobility by indicating that the UE 405 is to switch to communicating using a TCI state that is QCLed with an SSB from a PCI associated with a non-serving neighbor cell 415 (e.g., shown as PCI 2 in FIG. 4A). Accordingly, in the first LTM technique, the network node (e.g., the common CU controlling the serving cell 410 and the non-serving neighbor cells 415) may use L1/L2 signaling to select a beam from either the serving cell 410 or a non-serving neighbor cell 415 to serve the UE 405.

In this way, relative to restricting L1/L2 beam selection to beams within the serving cell 410, the first LTM technique may be more robust against blocking and may provide more opportunities for higher rank spatial division multiplexing across different cells. However, the first LTM technique does not enable support for changing a primary cell (PCell) or a primary secondary cell (PSCell) for a UE 405. Rather, in the first LTM technique, triggering a PCell or PSCell change is performed via a legacy L3 handover using RRC signaling. In this respect, the first LTM technique is associated with a limitation that L1/L2 signaling can only be used to indicate a beam from the serving cell 410 or a configured neighbor cell 415 while the UE 405 is in the coverage area of the serving cell 410 because L1/L2 signaling cannot be used to change the PCell or PSCell.

Figure 4B:
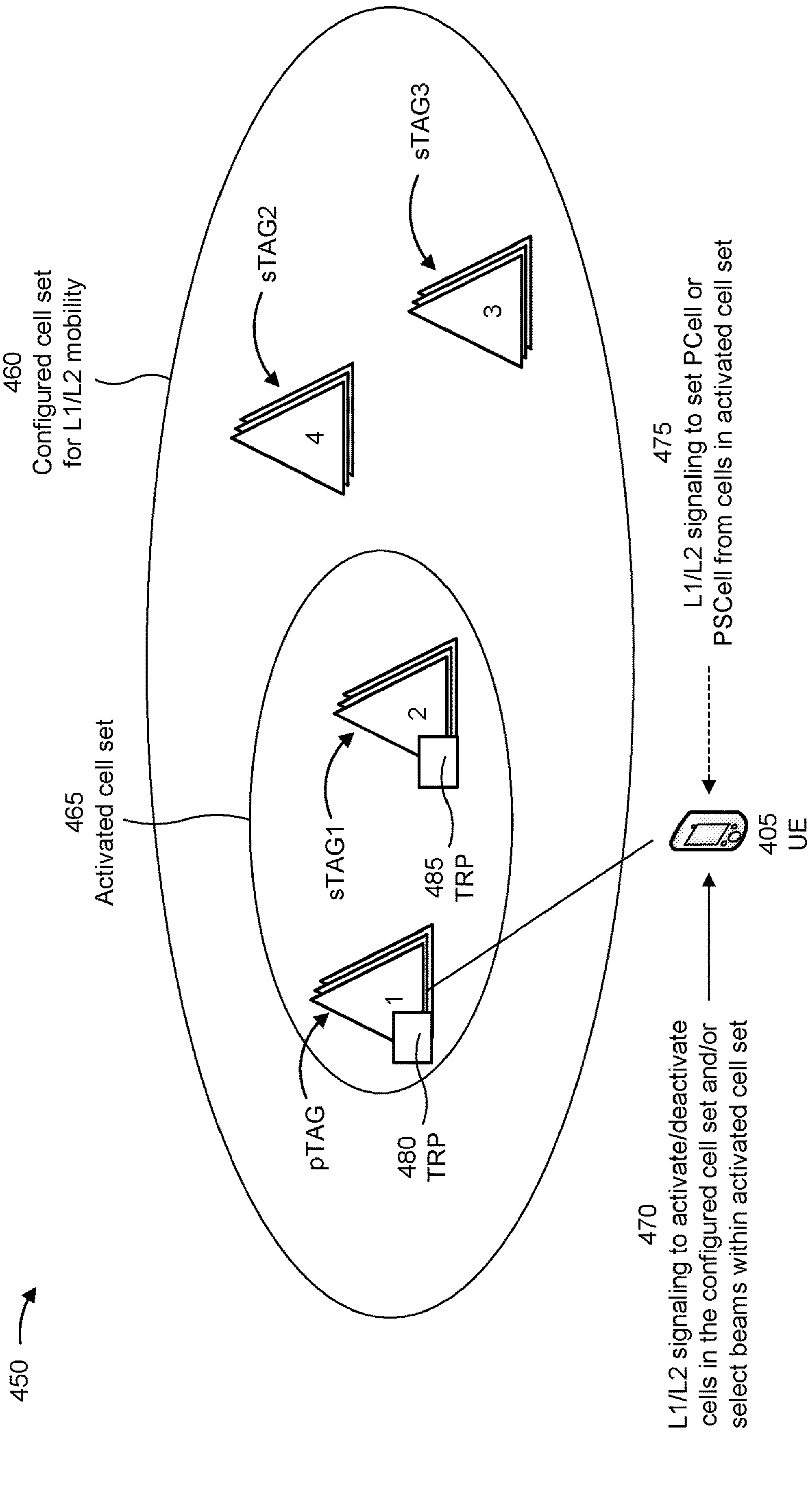
FIG. 4B illustrates an example of a second LTM technique, in accordance with the present disclosure.

Accordingly, FIG. 4B illustrates an example 450 of a second LTM technique, in accordance with the present disclosure. The second LTM technique may be referred to as inter-cell mobility scheme 2 and/or serving-cell-based inter-cell mobility, among other examples. As described in further detail herein, the second LTM technique may enable a network node to use L1/L2 signaling (e.g., DCI or a MAC-CE) to indicate control information associated with an activated cell set and/or a deactivated cell set, and/or to indicate a change to a PCell or a PSCell within the activated cell set.

For example, as shown in FIG. 4B, the second LTM technique may use mechanisms that are generally similar to carrier aggregation to enable LTM, except that different cells configured for LTM may be on the same carrier frequency. As shown in FIG. 4B, a network node may configure a cell set 460 for LTM (e.g., using RRC signaling) that includes at least a cell 1 ("1"), a cell 2 ("2"), a cell 3 ("3"), and a cell 4 ("4"). As further shown, an activated cell set 465 may include one or more cells in the configured cell set 460 that are activated and ready to use for data and/or control transfer. The activated cell set 465 may include cell 1 and cell 2, for example. Cell 1 may be a PCell and cell 2 may be a PSCell. Accordingly, in the second LTM technique, a deactivated cell set may include one or more cells (cell 3 and cell 4) that are included in the cell set 460 configured for LTM but are not included in the activated cell set 465. However, the cells that are included in the deactivated cell set can be readily activated, and thereby added to the activated cell set 465, using L1/L2 signaling. Accordingly, as shown by reference number 470, L1/L2 signaling can be used for mobility management of the activated cell set 465. For example, in some aspects, L1/L2 signaling can be used to activate cells within the configured cell set 460 (e.g., to add cells to the activated cell set 465), to deactivate cells in the activated cell set 465, and/or to select beams within the cells included in the activated cell set 465. In this way, the second LTM technique may enable seamless mobility among the cells included in the activated cell set 465 using L1/L2 signaling (e.g., using beam management techniques).

Furthermore, as shown by reference number 475, the second LTM technique enables using L1/L2 signaling to set or change a PCell or PSCell from the cells that are included in the activated cell set 465. Additionally, or alternatively, when the cell that is to become the new PCell or PSCell is in the deactivated cell set (e.g., is included in the cell set 460 configured for LTM but not the activated cell set 465), L1/L2 signaling can be used to move the cell from the deactivated cell set to the activated cell set 465 before further L1/L2 signaling is used to set the cell as the new PCell or PSCell. However, in the second LTM technique, an L3 handover (using RRC signaling) is used to change the PCell or PSCell when the new PCell or PSCell is not included in the cell set 460 configured for LTM. In such cases, RRC signaling associated with the L3 handover may be used to update the cells included in the cell set 460 that is configured for LTM.

In some aspects, multiple TRPs 480 and 485 may transmit communications (for example, the same communication or different communications) in the same transmission time interval (TTI) (for example, a slot, a mini-slot, a subframe, or a symbol) or different TTIs using different QCL relationships (for example, different spatial parameters, different TCI states, different precoding parameters, or different beamforming parameters). In some aspects, a TCI state may be used to indicate one or more QCL relationships. A TRP 480 may be configured to individually (for example, using dynamic selection) or jointly (for example, using joint transmission with one or more other TRPs 485) serve traffic to a UE 405. In some aspects, the TRP 480 and/or the TRP 485 may be, include, or be included in, one or more network nodes 110 described above in connection with FIGS. 1 and 2. In some examples, different TRPs 480 and 485 may be included in different base stations and/or other network nodes. In some cases, multiple TRPs 480 and 485 may be included in a single base station and/or other network node. In some cases, a TRP 480 and/or a TRP 485 may be referred to as a network node, a cell, a panel, an antenna array, and/or an array.

The cells in the LTM configured cell set 460 can belong to timing TAGs. "TAG" may refer to a group of cells that have the same (or similar within a threshold value) uplink TA values. For example, a first uplink carrier and a second uplink carrier may have different propagation delays between the UE 405 and the TRP 480 associated with cell 1 and between the UE 405 and the TRP 485. For example, the TRP 480 and the TRP 485 may not be co-located with one another, resulting in different propagation delays for uplink transmissions to reach a respective TRP on the different uplink carriers. As a result, the first uplink carrier and the second uplink carrier may have different timing advance values for uplink transmissions and may belong to different TAGs.

The UE 405 may use a timing advance value for an uplink carrier to transmit an uplink communication on the uplink carrier with a timing that results in synchronization of TTIs with a TRP 480 or 485, to reduce inter-TTI interference.

Uplink carriers can be transmitted asynchronously or synchronously. Two or more uplink carriers are typically synchronous when transmitted in the same subband. Two or more uplink carriers can be transmitted synchronously when a single TA command is used to control their timing. The transmissions of two uplink carriers can be considered to be asynchronous with respect to one another when the transmission of one of the carriers lags the transmission of the other carrier.

Multiple TAGs can be defined for the UE 405, which can be configured for carrier aggregation. A TAG typically comprises one or more uplink carriers controlled by the same TA commands transmitted from a TRP 480 and/or 485. TAGs can be configured by a serving TRP using dedicated signalling. A physical downlink control channel (PDCCH) order directed to an activated secondary cell in a TAG can initiate a RACH procedure that may result in the use of a PRACH. A PDCCH order may be used, for example, after UL and DL resources have been released and the TRP 480 has DL data to send to the UE 405.

When multiple TAGs are defined for the UE 405, timing differences can exist between uplink carriers transmitted by the UE 405, because the one or more TAGS can have received a TA command different from the TA commands received by the other TAGs. TA commands can cause two or more TAGS to have timing offsets that are different from one another, and these timing differences can be characterized as a relative delay between a pair of TAGs, or between corresponding component carriers, subframes, and/or symbols within the pair of TAGs.

In some cases, a group of co-located component carriers (e.g., cells) can belong to a same TAG. As shown, the configured cell set 460 can include multiple non-co-located TAGs. In some cases, each SCell can be configured to a TAG at the time of addition to the configured cell set 460. The TAG assignment can be determined by a network node (e.g., the TRP 480 and/or the TRP 485). TAG assignments can be based on band operation, existence of repeaters, cell location, and/or UE location, among other examples. To determine initial timing for a pTAG (e.g., a TAG containing a PCell), the UE 405 can perform a RACH procedure. To determine initial timing associated with an STAG (e.g., a TAG containing only SCells), the UE 405 can perform a RACH procedure associated with one of the SCells belonging to the sTAG. In some cases, a contention-free RACH procedure can be performed upon reception of a PDCCH order from a network node (e.g., the TRP 480 and/or the TRP 485).

In some circumstances, the UE 405 can experience RLF. A UE 405 can experience RLF if a handover fails or if a handover is not initiated when required. The UE 405 can detect RLF based at least in part a set of RLF conditions. In some cases, the UE 405 can detect RLF based on at least one RLF condition being satisfied. An RLF condition can be satisfied based on a set of block error rate (BLER) targets referred to as $Q_{in}$ (which corresponds to a state in which the link with the serving cell is considered reliable) and $Q_{out}$ (which corresponds to a state in which the link with the serving cell is considered unreliable). A UE 405 may determine that a BLER of a serving cell satisfies a condition associated with $Q_{out}$ (such that the serving cell of the UE 405 is considered unreliable), and may declare RLF if the BLER of the serving cell fails to satisfy a condition associated with $Q_{in}$ (such that the serving cell is once more considered reliable). Upon declaring RLF, the UE 405 may enter an idle mode, or may attempt to establish an RRC connection with a target cell (which may be the same as or different than the serving cell that experienced RLF). For example, the UE 405 may perform cell selection to recover from RLF, and may perform an RRC connection reestablishment procedure. For example, as part of cell selection for RLF recovery, the UE 405 may scan a last camped cell and cells from the UE's acquisition database (ACQ DB). If none of the cells in the ACQ DB are suitable for cell selection, the UE 405 may perform a full scan and the RLF recovery may be delayed. Furthermore, if the UE 405 identifies a target cell that is not associated with a feature in use by the UE 405, then usage of the feature may fail, or performance may be sub-optimal.

In some cases, a UE 405 can support dual connectivity and/or non-dual connectivity communications. Dual connectivity can include, for example, an Evolved Universal Mobile Telecommunications System Terrestrial Radio Access (E-UTRA)-NR dual connectivity (ENDC) mode. In the ENDC mode, a UE 405 communicates using an LTE RAT on a master cell group (MCG), and the UE 405 communicates using an NR RAT on a secondary cell group (SCG). Dual connectivity also can include, for example, an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

A UE 405 can enter an SCG deactivated state to save power when the UE 405, a master node, and/or a secondary node does not currently have data to transmit over the SCG. The UE 405 can enter the SCG deactivated state based at least in part on a deactivation command received from a base station. The UE 405 can transition from the SCG deactivated state to an SCG activated state based at least in part on data becoming available to transmit over the SCG at the UE 405, the master node, and/or the secondary node, and based at least in part on the UE 405 receiving an activation command from a base station.

The UE can perform radio resource management (RRM) measurements, RLM measurements, and/or BFD on a primary cell (PCell) and/or a primary secondary cell (PSCell), either of which may be referred to as a special cell (SpCell). In non-dual connectivity, an SpCell can be a PCell and, in dual connectivity, an SpCell can be a PCell in an MCG and/or a PSCell in an SCG. The UE 405 can detect an RLF based at least in part at least one RLF condition being satisfied. The at least one RLF condition may be satisfied based on the RRM measurements and/or the RLM measurements. For example, the RLF can occur for the UE 405 when the SpCell of the UE 405 is out of coverage.

For example, the UE 405 can measure downlink RLM reference signals on the SpCell, which may correspond to a synchronization signal block (SSB) or a physical broadcast channel (PBCH) signal, or may correspond to a periodic channel state information reference signal (CSI-RS) transmitted on a beam. The UE 405 can be configured with a set of RLM reference signals, which can be transmitted from a network node in a currently used beam of the UE 405 and/or neighbor beams of the UE 405. As an example, a network node can transmit a first RLM reference signal on a first beam, a second RLM reference signal on a second beam, and a third RLM reference signal on a third beam, where the second beam can be associated with a currently used beam and the first and third beams can be associated with neighbor beams.

The UE 405 can detect RLF based at least in part on an out-of-sync indication and/or an in-sync indication. The out-of-sync indication can be associated with the RLM reference signals (e.g., all of the RLM reference signals configured for the UE 405) being less than a configured threshold ($Q_{out}$). The out-of-sync indication can correspond to a presence of RLF for the UE 405. The in-sync indication can be associated with the RLM reference signals (e.g., any of the RLM reference signals configured for the UE 405) being greater than a configured threshold ($Q_{in}$). The in-sync indication can correspond to an absence of RLF for the UE 405. The UE 405 can detect RLF when no in-sync indications occur within a duration of a timer after the UE 405 detects a certain number of consecutive out-of-sync indications, indicating that channel conditions have deteriorated.

The UE 405 can measure a set of configured beam failure detection (BFD) reference signals, such as periodic CSI-RSs, transmitted on a set of beams from the base station to the UE. The UE 405 can determine that BFD reference signals (e.g., all BFD reference signals configured for the UE 405) are less than a configured threshold ($Q_{out\_BFD}$). A beam failure indication can be provided by a physical layer of the UE 405 to a medium access control (MAC) layer of the UE 405 based at least in part on the BFD reference signals being less than the configured threshold. The MAC layer of the UE 405 can determine a beam failure based at least in part on a configured maximum number of beam failure indications being satisfied. In other words, the UE 405 can determine the BFD based at least in part on the configured maximum number of beam failure indications being satisfied. The UE 405 can initiate an RLF recovery and/or a beam failure recovery (BFR) based at least in part on the BFD. The UE may initiate the RLF recovery and/or BFR based at least in part on performing a random access channel (RACH) procedure on a new cell and/or beam from a list of candidate cells and/or beams. In some cases, RLM and/or RLF procedures can be performed based on an SpCell only, which can result in a UE 405 declaring RLF and performing an RRC reestablishment procedure based on a connection issue with the SpCell, thereby causing communication delay as a result of the interruption due to the RLF and RRC reestablishment procedure.

Some aspects of the techniques and apparatuses described herein facilitate consideration of cells configured for LTM in the context of RLM and/or RLF. For example, in some aspects, a network node may configure and prepare a group of cells so that the UE may quickly switch to a new cell from the group in case of RLF. The group of cells may be a group of candidate cells of an LTM configured cell set. Thus, some aspects facilitate rapid cell switching based on detecting RLF, rather than performing an RRC reestablishment procedure. In this way, some aspects mitigate interruption delay due to RLF and RRC reestablishment, thereby positively impacting network performance.

In some aspects, a network node may use an RRC communication to configure a group of candidate cells. The group of candidate cells may be a group of cells of an LTM configured cell set. In some aspects, the group of candidate cells may correspond to a set of LTM-based RLF conditions for declaring an RLF associated with a source cell (e.g., an SpCell). The UE may detect RLF associated with the source cell based on the source cell and all of the candidate cells in the group satisfying the set of LTM-based RLF conditions. The set of LTM-based RLF conditions may include at least one RLF condition and at least one LTM-based condition associated with the group of candidate cells.

In some aspects, for example, the UE may detect RLF and declare RLF (e.g., transmit an RLF indication) based on the source cell satisfying at least one RLF condition of a set of RLF conditions and each of the candidate cells in the group having a channel quality that satisfies a channel quality condition (e.g., a channel quality threshold). The channel quality may include a beam quality, a cell quality, and/or a filtered channel quality, among other examples. In some aspects, the UE may not perform a separate RLM and/or RLF procedure for each of the candidate cells in the group, but may, instead, only consider the channel quality based on an RLF declaration resulting from the source cell satisfying the at least one RLF condition. In some aspects, the network node may indicate the group of candidate cells based on transmitting an indication of the group within an LTM cell configuration and/or a configuration of the group of candidate cells. In some aspects, the UE may be configured to detect RLF based on detecting RLF associated with each of the candidate cells in the group of candidate cells.

In some aspects, based on detecting RLF associated with the source cell and determining at least one eligible candidate cell of the group of candidate cells, the UE may perform a cell switch (e.g., handover) to one of the eligible candidate cells, which becomes a new SpCell. In some aspects, the UE may perform a cell switch to any one or more other Scells and/or TRPs based on an LTM configuration. In some aspects, if more than one candidate cell is eligible, the UE may choose a target cell, of the eligible candidate cells, based on at least one selection parameter. The at least one selection parameter may include at least one of a channel quality of the new SpCell, a channel quality of the new SpCell and the remaining cells configured in the corresponding candidate cell group, and/or a configured priority.

In some aspects, at UE execution of the LTM SpCell switch due to source cell RLF, the UE may not have a valid uplink timing. In some aspects, in a network-initiated LTM cell switch, the UE could be provided TA if needed, so that no RACH would be needed. In a UE autonomous SpCell switch, in the absence of uplink synchronization, the UE may perform RACH on the target cell to obtain timing and notify the target cell of the LTM SpCell switch. In some aspects, the UE may transmit a RACH message that also may include an indication of the beam being used by the UE. In some aspects, if the uplink timing is known (e.g., the source cell is a synchronized Scell), the UE may not need to perform a RACH procedure.

In some aspects, the UE may activate a timer based on the source cell satisfying the at least one RLF condition and/or based on the UE accessing the target cell due to the source cell RLF. In some aspects, if the timer expires before the UE successfully performs a cell switch (e.g., an SpCell switch), the UE may declare RLF and perform an L3 handover and/or reestablishment. If the UE successfully performs the cell switch before the timer expires, the timer may be reset. A successful SpCell switch may include a successful completion of a random access procedure on the target LTM cell, reception of a DCI (e.g. DL/UL grant) or MAC CE in response to an uplink signal transmission (e.g., a RACH message or a scheduling request (SR) and/or sounding reference signal (SRS) if a random access procedure is not performed), and/or reception, by the UE, of an RRC reconfiguration complete message from the network node.

As indicated above, FIGS. 4A and 4B are provided as examples. Other examples may differ from what is described with respect to FIGS. 4A and 4B.

Figure 5:
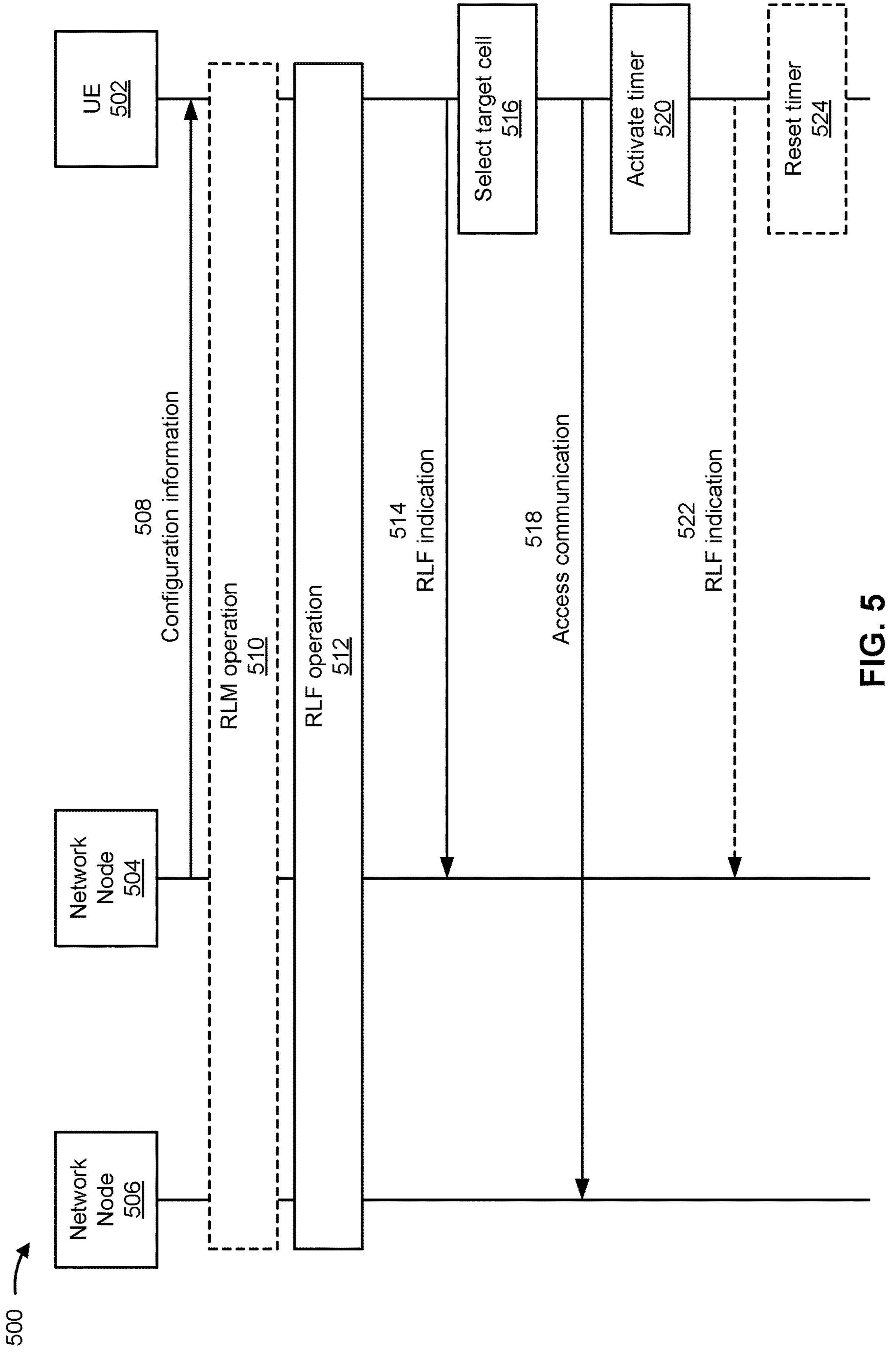
FIG. 5 is a diagram illustrating an example associated with LTM-based radio link failure (RLF) operations, in accordance with the present disclosure.

FIG. 5 is a diagram illustrating an example 500 associated with LTM-based RLF operations, in accordance with the present disclosure. As shown in FIG. 5, a UE 502 may communicate with a network node 504 and a network node 506. The UE 502 may be, be similar to, include, or be included in, the UE 405 depicted in FIGS. 4A and 4B and/or the UE 120 depicted in FIGS. 1 and 2. The network node 504 and/or the network node 506 may be, be similar to, include, or be included in the TRP 480 and/or TRP 485 depicted in FIG. 4B, the network node 110 depicted in FIGS. 1 and 2, and/or one or more components of the disaggregated base station architecture 300 depicted in FIG. 3. The network node 504 may be associated with a source cell (e.g., a currently active cell with which the UE 502 is in a connected state). The source cell also may be a primary cell (PCell) and/or a special cell (SpCell). The network node 506 may be associated with a secondary cell (SCell). In some aspects, the network node 506 may be associated with an SpCell. In some aspects, the network node 504 may be, include, or be included in, the network node 506.

As shown by reference number 508, the network node 504 may transmit, and the UE 502 may receive, configuration information. In some aspects, the configuration information may be transmitted using an RRC communication. The configuration information may correspond to an LTM operation associated with an LTM configured cell set. The configuration information may indicate a group of candidate cells, of the LTM configured cell set, corresponding to a set of LTM-based RLF conditions for declaring an RLF associated with a source cell. The source cell may be associated with the network node 504 and may be a special cell.

In some aspects, the configuration information may indicate an RLM configuration for performing an RLM operation associated with the group of candidate cells. In some aspects, the configuration information may include an LTM configuration that indicates the LTM configured cell set and the group of candidate cells. In some aspects, the configuration information may include a cell group configuration associated with the group of candidate cells. The cell group configuration may indicate the group of candidate cells.

As shown by reference number 510, the UE 502 may perform the RLM operation. As shown by reference number 512, the UE 502 may perform an RLF operation. For example, the UE 502 may perform an RLF operation based on the set of LTM-based RLF conditions. In some aspects, as shown by reference number 514, the UE 502 may perform the RLF operation based on transmitting an RLF indication based on the set of LTM-based RLF conditions being satisfied. In some aspects, the set of LTM-based RLF conditions may be satisfied based on satisfaction of at least one RLF condition of a set of RLF conditions by the source cell and each candidate cell of the group of candidate cells. In some aspects, the set of LTM-based RLF conditions may be satisfied based on the source cell satisfying at least one RLF condition of a set of RLF conditions and each candidate cell of the group of candidate cells satisfying a channel quality condition. In some aspects, the UE 502 may determine, based on the source cell satisfying the at least one RLF condition, a respective channel quality associated with each candidate cell of the group of candidate cells. In some aspects, the UE 502 may perform the RLF operation based on performing a cell handover to a target cell of the group of candidate cells based on the set of LTM-based RLF condition being satisfied. The set of LTM-based RLF conditions may be satisfied based on the source cell satisfying at least one RLF condition of a set of RLF conditions.

As shown by reference number 516, the UE 502 may select the target cell. The UE 502 may perform a cell handover to the target cell. The UE 502 may select the target cell from the group of candidate cells based on at least one selection parameter. The at least one selection parameter may include a channel quality of the target cell, a channel of an unselected cell of the group of candidate cells, and/or a configured priority, among other examples. In some aspects, where the cell handover is a network-initiated cell switch operation, the UE 502 may receive, from the network node 504, timing advance information associated with the target cell. In some aspects, the cell handover may be a UE-initiated cell switch operation and the UE 502 may transmit, to the network node 506 (associated with the target cell), a RACH message. The RACH message may indicate the cell handover and the network node 506 may transmit, and the UE 502 may receive, based on the RACH message, timing advance information associated with the target cell. In some aspects, the RACH message may indicate a beam associated with the UE 502.

In some aspects, performing the RLF operation may include activating a timer. For example, as shown by reference number 518, the UE 502 may transmit, and the network node 506 may receive, an access communication. The UE 502 may transmit the access communication for initiating a cell handover to the target cell. As shown by reference number 520, the UE 502 may activate a timer. For example, the UE 502 may activate the timer based on at least one of the set of LTM-based RLF conditions being satisfied or transmitting the access communication. As shown by reference number 522, the UE 502 may transmit, and the network node 504 may receive, an RLF indication. The UE 502 may transmit the RLF indication based on an expiration of the timer occurring prior to completion of a successful cell handover to the target cell. In this case, the UE 502 may perform a reestablishment operation based on the expiration of the timer occurring prior to completion of the successful cell handover.

As shown by reference number 524, the UE 502 may reset the timer. For example, the UE 502 may reset the timer based on completion of a successful cell handover to the target cell. In some aspects, the completion of the successful cell handover to the target cell may be based on at least one of a successful completion of a random access procedure associated with the target cell, reception of DCI in response to an uplink communication to a network node associated with the target cell, reception of a MAC CE in response to an uplink communication to a network node associated with the target cell, or reception of an RRC reconfiguration complete message from a network node associated with the target cell.

As indicated above, FIG. 5 is provided as an example. Other examples may differ from what is described with regard to FIG. 5.

Figure 6:
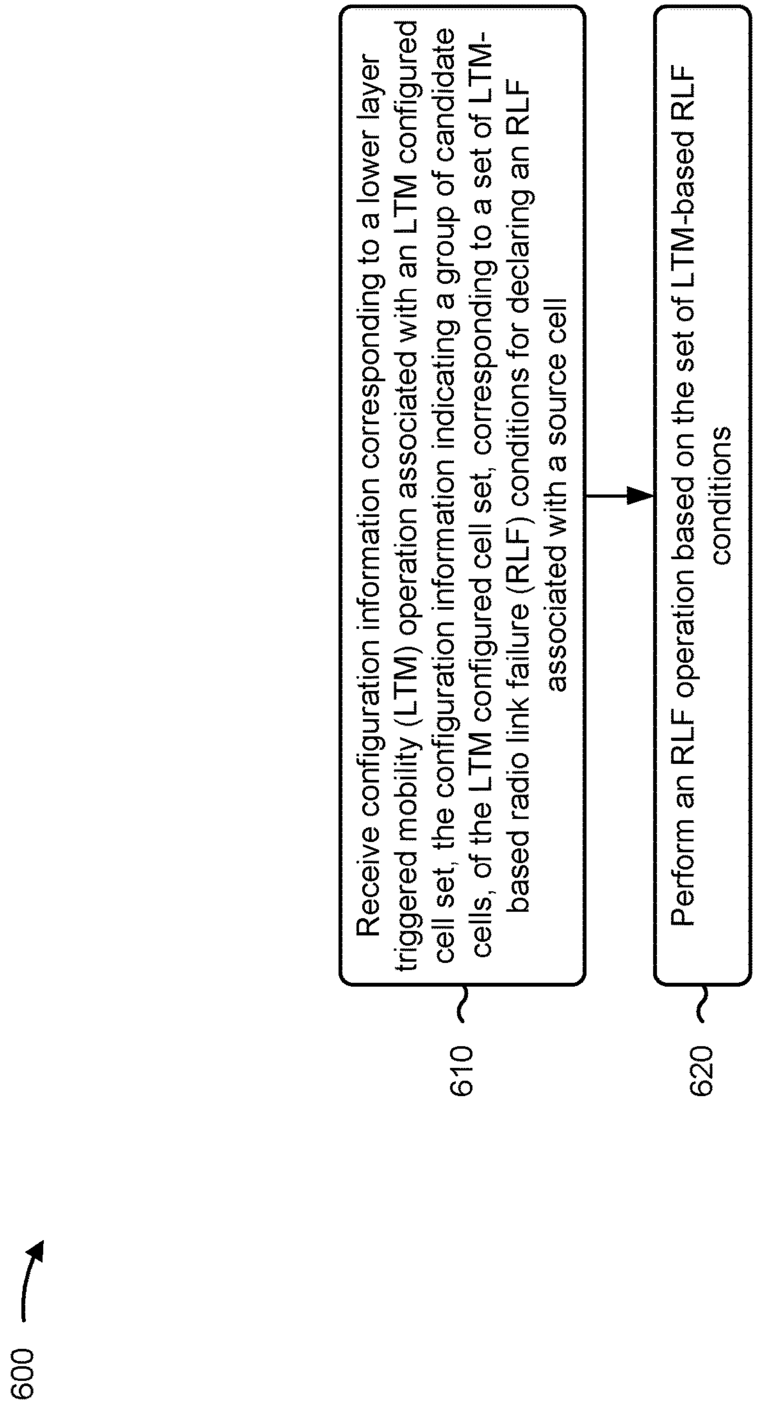
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 502) performs operations associated with LTM-based RLF operations.

As shown in FIG. 6, in some aspects, process 600 may include receiving configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell (block 610). For example, the UE (e.g., using communication manager 808 and/or reception component 802, depicted in FIG. 8) may receive configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell, as described above.

As further shown in FIG. 6, in some aspects, process 600 may include performing an RLF operation based on the set of LTM-based RLF conditions (block 620). For example, the UE (e.g., using communication manager 808, reception component 802, and/or transmission component 804, depicted in FIG. 8) may perform an RLF operation based on the set of LTM-based RLF conditions, as described above.

Process 600 may include additional aspects, such as any single aspect or any combination of aspects described below and/or in connection with one or more other processes described elsewhere herein.

In a first aspect, the configuration information indicates an RLM configuration for performing an RLM operation associated with the group of candidate cells. In a second aspect, alone or in combination with the first aspect, process 600 includes performing the RLM operation associated with the group of candidate cells. In a third aspect, alone or in combination with one or more of the first and second aspects, performing the RLF operation comprises transmitting an RLF indication based on the set of LTM-based RLF conditions being satisfied. In a fourth aspect, alone or in combination with the third aspect, the set of LTM-based RLF conditions are satisfied based on satisfaction of at least one RLF condition of a set of RLF conditions by the source cell and each candidate cell of the group of candidate cells.

In a fifth aspect, alone or in combination with one or more of the third or fourth aspects, the set of LTM-based RLF conditions are satisfied based on the source cell satisfying at least one RLF condition of a set of RLF conditions, and each candidate cell of the group of candidate cells satisfying a channel quality condition. In a sixth aspect, alone or in combination with the fifth aspect, process 600 includes determining, based on the source cell satisfying the at least one RLF condition, a respective channel quality associated with each candidate cell of the group of candidate cells. In a seventh aspect, alone or in combination with one or more of the first through sixth aspects, the configuration information comprises an LTM configuration that indicates the LTM configured cell set and the group of candidate cells. In an eighth aspect, alone or in combination with one or more of the first through seventh aspects, the configuration information comprises a cell group configuration associated with the group of candidate cells, the cell group configuration indicating the group of candidate cells.

In a ninth aspect, alone or in combination with one or more of the first through eighth aspects, performing the RLF operation comprises performing a cell handover to a target cell of the group of candidate cells based on the set of LTM-based RLF condition being satisfied, wherein the set of LTM-based RLF conditions are satisfied based on the source cell satisfying at least one RLF condition of a set of RLF conditions. In a tenth aspect, alone or in combination with the ninth aspect, process 600 includes selecting the target cell from the group of candidate cells based on at least one selection parameter. In an eleventh aspect, alone or in combination with the tenth aspect, the at least one selection parameter comprises at least one of a channel quality of the target cell, a channel of an unselected cell of the group of candidate cells, or a configured priority.

In a twelfth aspect, alone or in combination with one or more of the ninth through eleventh aspects, the cell handover comprises a network-initiated cell switch operation, process 600 includes receiving, from a network node associated with the source cell, timing advance information associated with the target cell. In a thirteenth aspect, alone or in combination with one or more of the ninth through twelfth aspects, the cell handover comprises a UE-initiated cell switch operation, and process 600 includes transmitting, to a network node associated with the target cell, a RACH message that indicates the cell handover, and receiving, based on the RACH message, timing advance information associated with the target cell. In a fourteenth aspect, alone or in combination with the thirteenth aspect, the RACH message indicates a beam associated with the UE.

In a fifteenth aspect, alone or in combination with one or more of the first through fourteenth aspects, performing the RLF operation comprises transmitting, to a network node associated with a target cell of the group of candidate cells based on the set of LTM-based RLF conditions being satisfied, an access communication for initiating a cell handover to the target cell, and activating a timer based on at least one of the set of LTM-based RLF conditions being satisfied or transmitting the access communication. In a sixteenth aspect, alone or in combination with the fifteenth aspect, process 600 includes transmitting an RLF indication based on an expiration of the timer occurring prior to completion of a successful cell handover to the target cell and performing a reestablishment operation based on the expiration of the timer occurring prior to completion of the successful cell handover. In a seventeenth aspect, alone or in combination with the fifteenth aspect, process 600 includes resetting the timer based on completion of a successful cell handover to the target cell. In an eighteenth aspect, alone or in combination with the seventeenth aspect, the completion of the successful cell handover to the target cell is based on at least one of a successful completion of a random access procedure associated with the target cell, reception of DCI in response to an uplink communication to a network node associated with the target cell, reception of a MAC CE in response to an uplink communication to a network node associated with the target cell, or reception of an RRC reconfiguration complete message from a network node associated with the target cell.

In a nineteenth aspect, alone or in combination with one or more of the first through eighteenth aspects, receiving the configuration information comprises receiving an RRC communication that includes the configuration information. In a twentieth aspect, alone or in combination with one or more of the first through nineteenth aspects, the source cell comprises a special cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
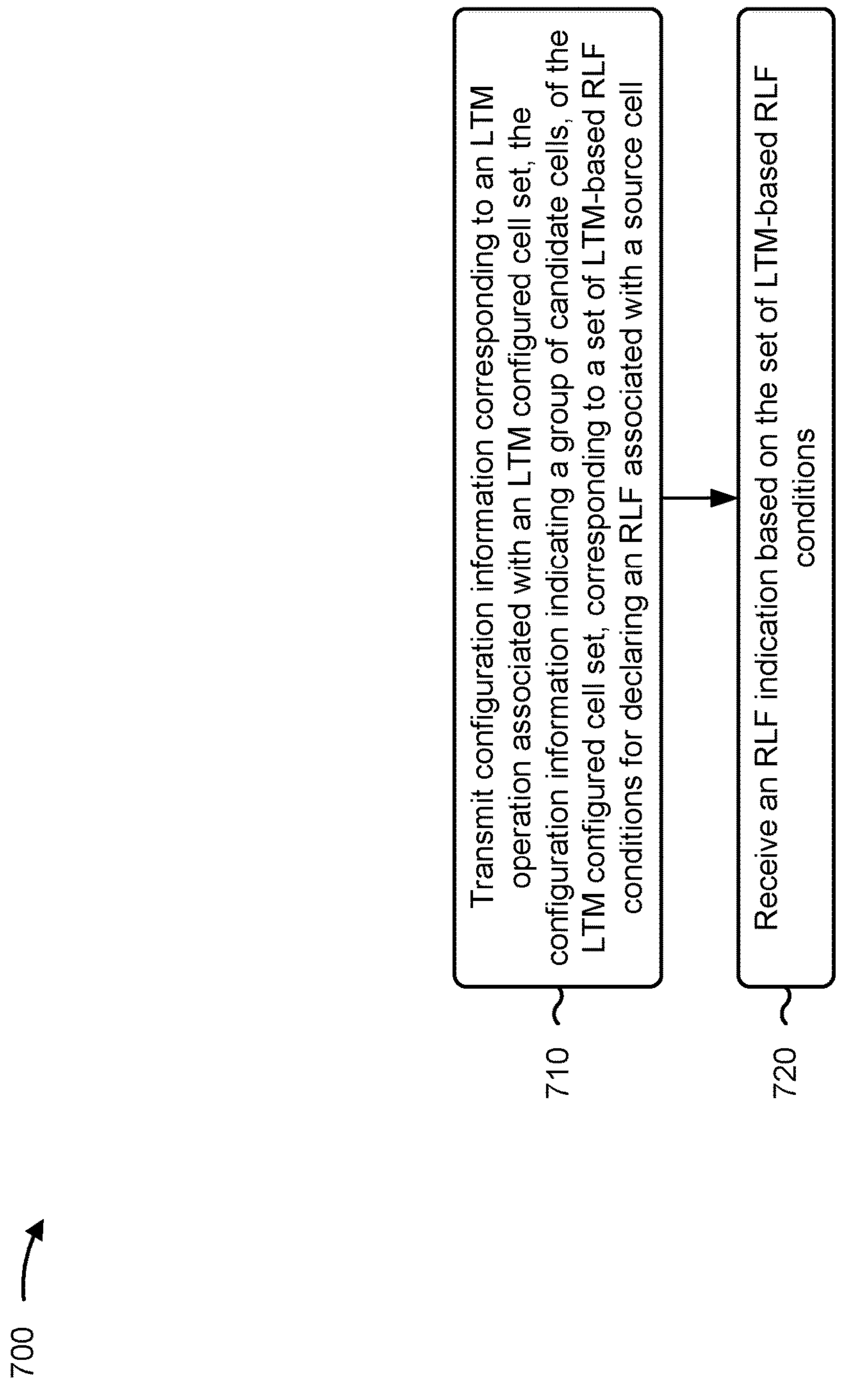
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with LTM-based RLF operations.

As shown in FIG. 7, in some aspects, process 700 may include transmitting configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell (block 710). For example, the network node (e.g., using communication manager 908 and/or transmission component 904, depicted in FIG. 9) may transmit configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell, as described above.

As further shown in FIG. 7, in some aspects, process 700 may include receiving an RLF indication based on the set of LTM-based RLF conditions (block 720). For example, the network node (e.g., using communication manager 908 and/or reception component 902, depicted in FIG. 9) may receive an RLF indication based on the set of LTM-based RLF conditions, as described above.

Process 700 may include additional aspects, such as any single aspect or any combination of aspects described below and/or in connection with one or more other processes described elsewhere herein.

In a first aspect, the configuration information indicates an RLM configuration for performing an RLM operation associated with the group of candidate cells. In a second aspect, alone or in combination with the first aspect, receiving the RLF indication comprises receiving the RLF indication based on the set of LTM-based RLF conditions being satisfied. In a third aspect, alone or in combination with the second aspect, the set of LTM-based RLF conditions are satisfied based on satisfaction of at least one RLF condition of a set of RLF conditions by the source cell and each candidate cell of the group of candidate cells. In a fourth aspect, alone or in combination with one or more of the second or third aspects, the set of LTM-based RLF conditions are satisfied based on the source cell satisfying at least one RLF condition of a set of RLF conditions, and each candidate cell of the group of candidate cells satisfying a channel quality condition.

In a fifth aspect, alone or in combination with one or more of the first through fourth aspects, the configuration information comprises an LTM configuration that indicates the LTM configured cell set and the group of candidate cells. In a sixth aspect, alone or in combination with one or more of the first through fifth aspects, the configuration information comprises a cell group configuration associated with the group of candidate cells, the cell group configuration indicating the group of candidate cells. In a seventh aspect, alone or in combination with one or more of the first through sixth aspects, receiving the RLF indication comprises receiving the RLF indication based on an expiration of a timer occurring prior to completion of a successful cell handover to a target cell. In an eighth aspect, alone or in combination with the seventh aspect, process 700 includes performing a reestablishment operation based on the expiration of the timer occurring prior to completion of the successful cell handover. In a ninth aspect, alone or in combination with the seventh aspect, the completion of the successful cell handover to the target cell is based on at least one of a successful completion of a random access procedure associated with the target cell, reception, by a UE of DCI in response to an uplink communication to a network node associated with the target cell, reception, by the UE, of a MAC CE in response to an uplink communication to a network node associated with the target cell, or reception, by the UE, of an RRC reconfiguration complete message from a network node associated with the target cell.

In a tenth aspect, alone or in combination with one or more of the first through ninth aspects, transmitting the configuration information comprises transmitting an RRC communication that includes the configuration information. In an eleventh aspect, alone or in combination with one or more of the first through tenth aspects, the source cell comprises a special cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
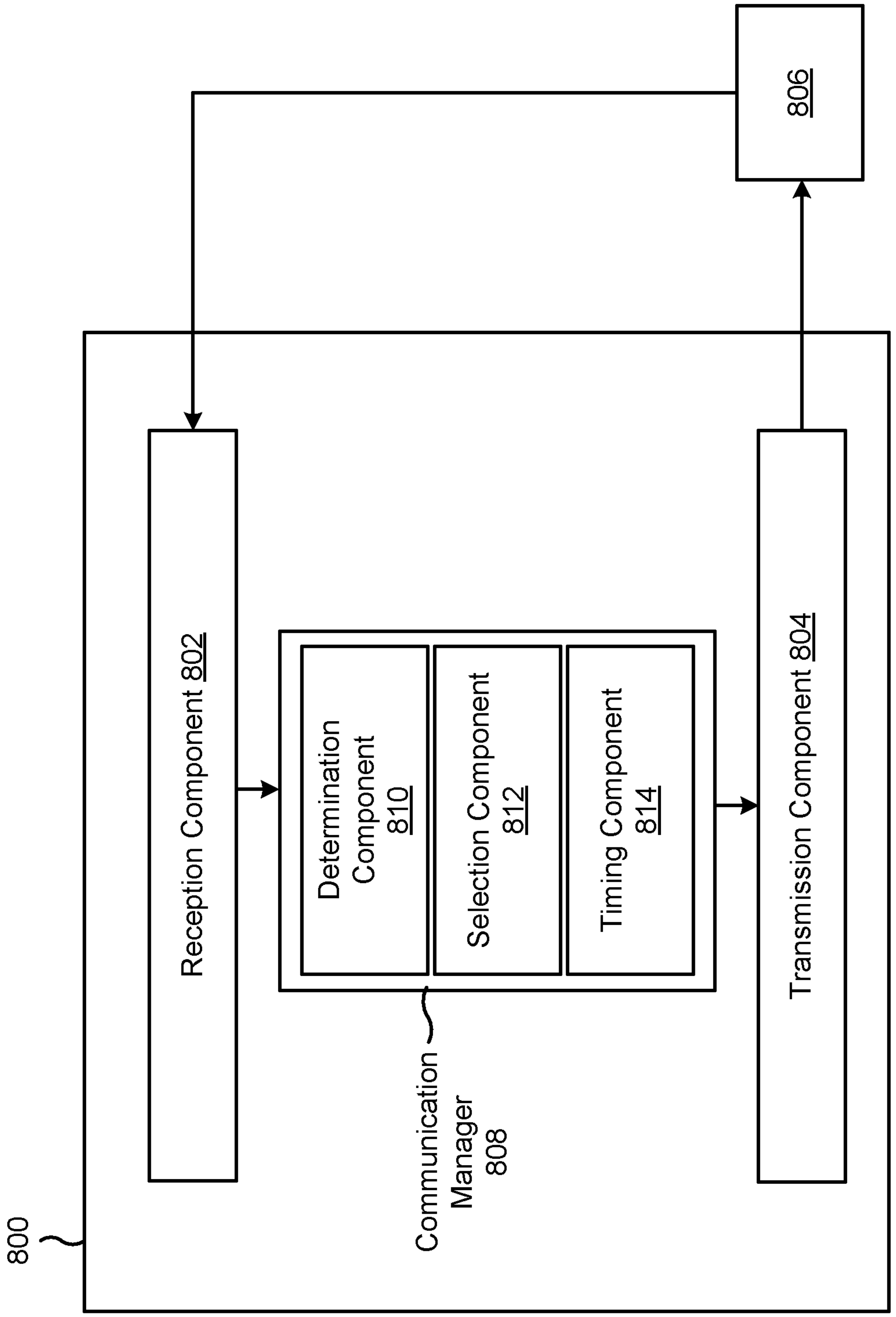
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808. The communication manager 808 may include one or more of a determination component 810, a selection component 812, or a timing component 814, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, transmitting, determining, selecting, activating, performing, and/or resetting, among other examples, may include various processing system components, such as a receive processor, a transmit processor, a controller/processor, a memory, or a combination thereof, of the UE described above in connection with FIG. 2.

The communication manager 808 and/or the reception component 802 may receive configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. In some aspects, the communication manager 808 may include one or more antennas, a modem, a controller/processor, a memory, or a combination thereof, of the UE described in connection with FIG. 2. In some aspects, the communication manager 808 may include the reception component 802 and/or the transmission component 804. In some aspects, the communication manager 808 may be, be similar to, include, or be included in, the communication manager 140 depicted in FIGS. 1 and 2.

The communication manager 808, the reception component 802, and/or the transmission component 804 may perform an RLF operation based on the set of LTM-based RLF conditions. The communication manager 808, the reception component 802, and/or the transmission component 804 may perform the RLM operation associated with the group of candidate cells. The communication manager 808 and/or the determination component 810 may determine, based on the source cell satisfying the at least one RLF condition, a respective channel quality associated with each candidate cell of the group of candidate cells. In some aspects, the determination component 810 may include a controller/processor, a memory, or a combination thereof, of the UE described in connection with FIG. 2. In some aspects, the determination component 810 may include the reception component 802 and/or the transmission component 804.

The communication manager 808 and/or the selection component 812 may select the target cell from the group of candidate cells based on at least one selection parameter. In some aspects, the selection component 812 may include one or more antennas, a modem, a controller/processor, a memory, or a combination thereof, of the UE described in connection with FIG. 2. In some aspects, the selection component 812 may include the reception component 802 and/or the transmission component 804. The communication manager 808 and/or the transmission component 804 may transmit an RLF indication based on an expiration of the timer occurring prior to completion of a successful cell handover to the target cell.

The communication manager 808, the reception component 802, and/or the transmission component 804 may perform a reestablishment operation based on the expiration of the timer occurring prior to completion of the successful cell handover. The communication manager 808 and/or the timing component 814 may reset the timer based on completion of a successful cell handover to the target cell. In some aspects, the timing component 814 may include one or more antennas, a modem, a controller/processor, a memory, or a combination thereof, of the UE described in connection with FIG. 2. In some aspects, the timing component 814 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
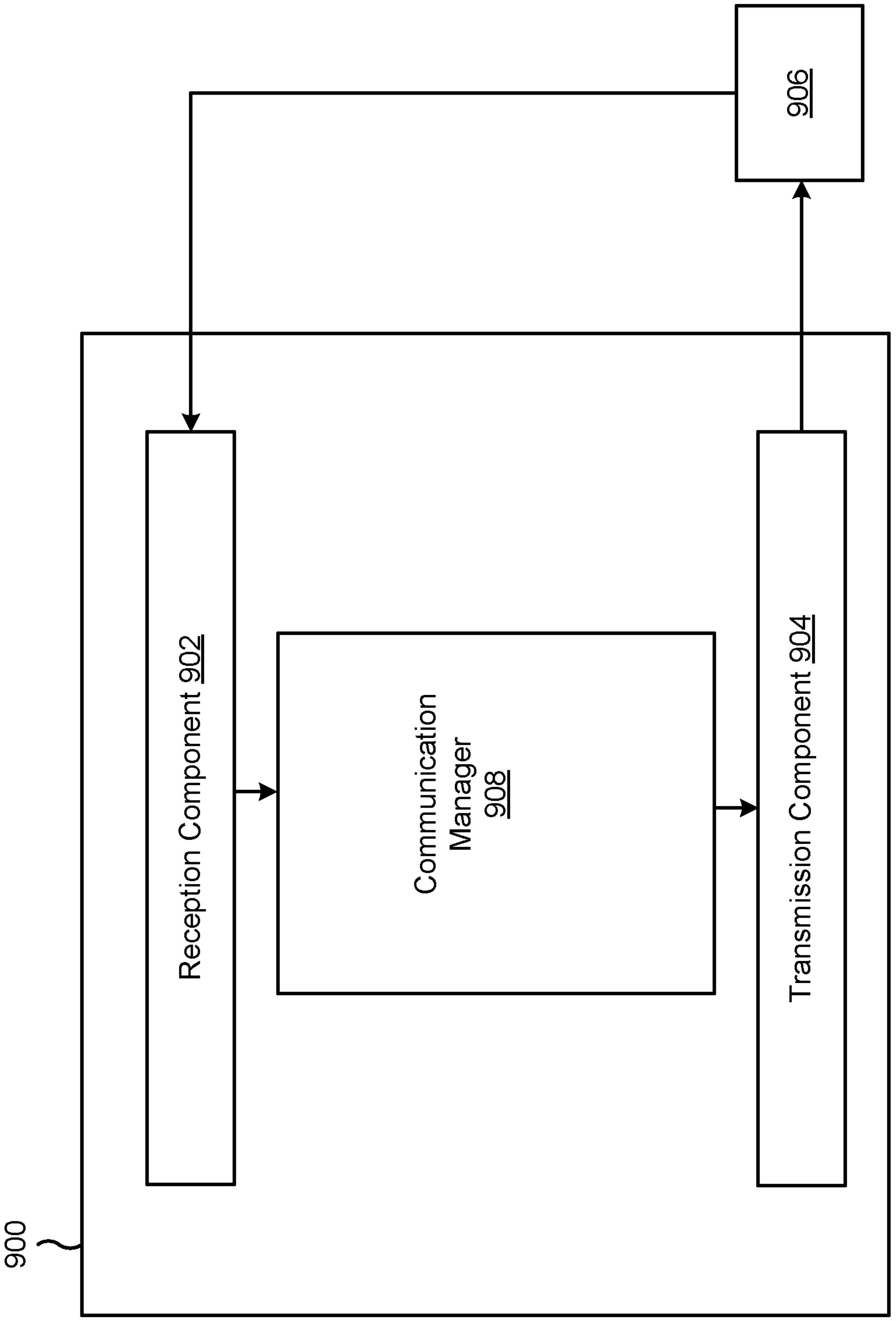
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

In some examples, means for transmitting, outputting, or sending (or means for outputting for transmission) may include one or more antennas, a modulator, a transmit MIMO processor, a transmit processor, or a combination thereof, of the network node described above in connection with FIG. 2.

In some examples, means for receiving (or means for obtaining) may include one or more antennas, a demodulator, a MIMO detector, a receive processor, or a combination thereof, of the network node described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for transmitting, receiving, and/or performing, among other examples, may include various processing system components, such as a receive processor, a transmit processor, a controller/processor, a memory, or a combination thereof, of the network node described above in connection with FIG. 2.

The communication manager 908 and/or the transmission component 904 may transmit configuration information corresponding to an LTM operation associated with an LTM configured cell set, the configuration information indicating a group of candidate cells, of the LTM configured cell set, corresponding to a set of LTM-based RLF conditions for declaring an RLF associated with a source cell. The reception component 902 may receive an RLF indication based on the set of LTM-based RLF conditions. In some aspects, the communication manager 908 may include one or more antennas, a modem, a controller/processor, a memory, or a combination thereof, of the network node described in connection with FIG. 2. In some aspects, the communication manager 908 may include the reception component 902 and/or the transmission component 904. The communication manager 908, the reception component 802, and/or the transmission component 804 may perform a reestablishment operation based on the expiration of the timer occurring prior to completion of the successful cell handover.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell; and performing an RLF operation based on the set of LTM-based RLF conditions.

Aspect 2: The method of Aspect 1, wherein the configuration information indicates a radio link monitoring (RLM) configuration for performing an RLM operation associated with the group of candidate cells.

Aspect 3: The method of Aspect 2, further comprising performing the RLM operation associated with the group of candidate cells.

Aspect 4: The method of any of Aspects 1-3, wherein performing the RLF operation comprises transmitting an RLF indication based on the set of LTM-based RLF conditions being satisfied.

Aspect 5: The method of Aspect 4, wherein the set of LTM-based RLF conditions are satisfied based on satisfaction of at least one RLF condition of a set of RLF conditions by the source cell and each candidate cell of the group of candidate cells.

Aspect 6: The method of either of claim 4 or 5, wherein the set of LTM-based RLF conditions are satisfied based on: the source cell satisfying at least one RLF condition of a set of RLF conditions; and each candidate cell of the group of candidate cells satisfying a channel quality condition.

Aspect 7: The method of Aspect 6, further comprising determining, based on the source cell satisfying the at least one RLF condition, a respective channel quality associated with each candidate cell of the group of candidate cells.

Aspect 8: The method of any of Aspects 1-7, wherein the configuration information comprises an LTM configuration that indicates the LTM configured cell set and the group of candidate cells.

Aspect 9: The method of any of Aspects 1-8, wherein the configuration information comprises a cell group configuration associated with the group of candidate cells, the cell group configuration indicating the group of candidate cells.

Aspect 10: The method of any of Aspects 1-9, wherein performing the RLF operation comprises performing a cell handover to a target cell of the group of candidate cells based on the set of LTM-based RLF condition being satisfied, wherein the set of LTM-based RLF conditions are satisfied based on the source cell satisfying at least one RLF condition of a set of RLF conditions.

Aspect 11: The method of Aspect 10, further comprising selecting the target cell from the group of candidate cells based on at least one selection parameter.

Aspect 12: The method of Aspect 11, wherein the at least one selection parameter comprises at least one of a channel quality of the target cell, a channel of an unselected cell of the group of candidate cells, or a configured priority.

Aspect 13: The method of any of Aspects 10-12, wherein the cell handover comprises a network-initiated cell switch operation, the method further comprising receiving, from a network node associated with the source cell, timing advance information associated with the target cell.

Aspect 14: The method of any of Aspects 10-12, wherein the cell handover comprises a UE-initiated cell switch operation, the method further comprising: transmitting, to a network node associated with the target cell, a random access channel (RACH) message that indicates the cell handover; and receiving, based on the RACH message, timing advance information associated with the target cell.

Aspect 15: The method of Aspect 14, wherein the RACH message indicates a beam associated with the UE.

Aspect 16: The method of any of Aspects 1-15, wherein performing the RLF operation comprises: transmitting, to a network node associated with a target cell of the group of candidate cells based on the set of LTM-based RLF conditions being satisfied, an access communication for initiating a cell handover to the target cell; and activating a timer based on at least one of the set of LTM-based RLF conditions being satisfied or transmitting the access communication.

Aspect 17: The method of Aspect 16, further comprising: transmitting an RLF indication based on an expiration of the timer occurring prior to completion of a successful cell handover to the target cell; and performing a reestablishment operation based on the expiration of the timer occurring prior to completion of the successful cell handover.

Aspect 18: The method of any of Aspects 16-17, further comprising resetting the timer based on completion of a successful cell handover to the target cell.

Aspect 19: The method of Aspect 18, wherein the completion of the successful cell handover to the target cell is based on at least one of a successful completion of a random access procedure associated with the target cell, reception of downlink control information in response to an uplink communication to a network node associated with the target cell, reception of a medium access control control element in response to an uplink communication to a network node associated with the target cell, or reception of a radio resource control reconfiguration complete message from a network node associated with the target cell.

Aspect 20: The method of any of Aspects 1-19, wherein receiving the configuration information comprises receiving a radio resource control communication that includes the configuration information.

Aspect 21: The method of any of Aspects 1-20, wherein the source cell comprises a special cell.

Aspect 22: A method of wireless communication performed by a network node, comprising: transmitting configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell; and receiving an RLF indication based on the set of LTM-based RLF conditions.

Aspect 23: The method of Aspect 22, wherein the configuration information indicates a radio link monitoring (RLM) configuration for performing an RLM operation associated with the group of candidate cells.

Aspect 24: The method of either of claim 22 or 23, wherein receiving the RLF indication comprises receiving the RLF indication based on the set of LTM-based RLF conditions being satisfied.

Aspect 25: The method of Aspect 24, wherein the set of LTM-based RLF conditions are satisfied based on satisfaction of at least one RLF condition of a set of RLF conditions by the source cell and each candidate cell of the group of candidate cells.

Aspect 26: The method of either of Aspects 24 or 25, wherein the set of LTM-based RLF conditions are satisfied based on: the source cell satisfying at least one RLF condition of a set of RLF conditions; and each candidate cell of the group of candidate cells satisfying a channel quality condition.

Aspect 27: The method of any of Aspects 22-26, wherein the configuration information comprises an LTM configuration that indicates the LTM configured cell set and the group of candidate cells.

Aspect 28: The method of any of Aspects 22-28, wherein the configuration information comprises a cell group configuration associated with the group of candidate cells, the cell group configuration indicating the group of candidate cells.

Aspect 29: The method of any of Aspects 22-29, wherein receiving the RLF indication comprises receiving the RLF indication based on an expiration of a timer occurring prior to completion of a successful cell handover to a target cell.

Aspect 30: The method of Aspect 29, further comprising performing a reestablishment operation based on the expiration of the timer occurring prior to completion of the successful cell handover.

Aspect 31: The method of any of Aspects 29-30, wherein the completion of the successful cell handover to the target cell is based on at least one of a successful completion of a random access procedure associated with the target cell, reception, by a user equipment (UE) of downlink control information in response to an uplink communication to a network node associated with the target cell, reception, by the UE, of a medium access control control element in response to an uplink communication to a network node associated with the target cell, or reception, by the UE, of a radio resource control reconfiguration complete message from a network node associated with the target cell.

Aspect 32: The method of any of Aspects 22-31, wherein transmitting the configuration information comprises transmitting a radio resource control communication that includes the configuration information.

Aspect 33: The method of any of Aspects 22-32, wherein the source cell comprises a special cell.

Aspect 34: An apparatus for wireless communication at a device, comprising one or more processors; one or more memories coupled with the processors; and instructions stored in the one or more memories and executable by the one or more processors, individually or in any combination, to cause the apparatus to perform the method of one or more of Aspects 1-21.

Aspect 35: A device for wireless communication, comprising one or more memories and one or more processors coupled to the one or more memories, the one or more processors configured, individually or in any combination, to cause the device to perform the method of one or more of Aspects 1-21.

Aspect 36: An apparatus for wireless communication, comprising at least one means for performing the method of one or more of Aspects 1-21.

Aspect 37: A non-transitory computer-readable medium storing code for wireless communication, the code comprising instructions executable by a processor to perform the method of one or more of Aspects 1-21.

Aspect 38: A non-transitory computer-readable medium storing a set of instructions for wireless communication, the set of instructions comprising one or more instructions that, when executed by one or more processors of a device, cause the device to perform the method of one or more of Aspects 1-21.

Aspect 39: An apparatus for wireless communication at a device, comprising one or more processors; one or more memories coupled with the one or more processors; and instructions stored in the one or more memories and executable by the one or more processors, individually or in any combination, to cause the apparatus to perform the method of one or more of Aspects 22-33.

Aspect 40: A device for wireless communication, comprising one or more memories and one or more processors coupled to the one or more memories, the one or more processors configured, individually or in any combination, to perform the method of one or more of Aspects 22-33.

Aspect 41: An apparatus for wireless communication, comprising at least one means for performing the method of one or more of Aspects 22-33.

Aspect 42: A non-transitory computer-readable medium storing code for wireless communication, the code comprising instructions executable by a processor to perform the method of one or more of Aspects 22-33.

Aspect 43: A non-transitory computer-readable medium storing a set of instructions for wireless communication, the set of instructions comprising one or more instructions that, when executed by one or more processors of a device, cause the device to perform the method of one or more of Aspects 22-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, which are configured, individually or in any combination, to cause the UE to:

receive configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell; and perform an RLF operation based on the set of LTM-based RLF conditions, wherein a timer is activated based on at least one condition of the set of LTM-based RLF conditions being satisfied.

2. The UE of claim 1, wherein the configuration information indicates a radio link monitoring (RLM) configuration for performing an RLM operation associated with the group of candidate cells.

3. The UE of claim 2, wherein the one or more processors are further configured to cause the UE to perform the RLM operation associated with the group of candidate cells.

4. The UE of claim 1, wherein the one or more processors, to cause the UE to perform the RLF operation, are configured to cause the UE to transmit an RLF indication based on the set of LTM-based RLF conditions being satisfied.

5. The UE of claim 4, wherein the set of LTM-based RLF conditions are satisfied based on satisfaction of the at least one condition by the source cell and each candidate cell of the group of candidate cells.

6. The UE of claim 4, wherein the set of LTM-based RLF conditions are satisfied based on:

the source cell satisfying the at least one condition; and each candidate cell of the group of candidate cells satisfying a channel quality condition.

7. The UE of claim 6, wherein the one or more processors are further configured to cause the UE to determine, based on the source cell satisfying the at least one condition, a respective channel quality associated with each candidate cell of the group of candidate cells.

8. The UE of claim 1, wherein the configuration information comprises an LTM configuration that indicates the LTM configured cell set and the group of candidate cells.

9. The UE of claim 1, wherein the configuration information comprises a cell group configuration associated with the group of candidate cells, the cell group configuration indicating the group of candidate cells.

10. The UE of claim 1, wherein the one or more processors, to cause the UE to perform the RLF operation, are configured to cause the UE to perform a cell handover to a target cell of the group of candidate cells based on the set of LTM-based RLF conditions being satisfied, wherein the set of LTM-based RLF conditions are satisfied based on the source cell satisfying the at least one condition.

11. The UE of claim 10, wherein the one or more processors are further configured to cause the UE to select the target cell from the group of candidate cells based on at least one selection parameter.

12. The UE of claim 11, wherein the at least one selection parameter comprises at least one of a channel quality of the target cell, a channel of an unselected cell of the group of candidate cells, or a configured priority.

13. The UE of claim 12, wherein the cell handover comprises a network-initiated cell switch operation, and wherein the one or more processors are further configured to cause the UE to receive, from a network node associated with the source cell, timing advance information associated with the target cell.

14. The UE of claim 12, wherein the cell handover comprises a UE-initiated cell switch operation, and wherein the one or more processors are further configured to cause the UE to:

transmit, to a network node associated with the target cell, a random access channel (RACH) message that indicates the cell handover; and receive, based on the RACH message, timing advance information associated with the target cell.

15. The UE of claim 14, wherein the RACH message indicates a beam associated with the UE.

16. The UE of claim 1, wherein the one or more processors, to cause the UE to perform the RLF operation, are configured to cause the UE to:

transmit, to a network node associated with a target cell of the group of candidate cells based on the set of LTM-based RLF conditions being satisfied, an access communication for initiating a cell handover to the target cell.

17. The UE of claim 16, wherein the one or more processors are further configured to cause the UE to:

transmit an RLF indication based on an expiration of the timer occurring prior to completion of a successful cell handover to the target cell; and perform a reestablishment operation based on the expiration of the timer occurring prior to the completion of the successful cell handover.

18. The UE of claim 16, wherein the one or more processors are further configured to cause the UE to reset the timer based on completion of a successful cell handover to the target cell.

19. The UE of claim 18, wherein the completion of the successful cell handover to the target cell is based on at least one of a successful completion of a random access procedure associated with the target cell, reception of downlink control information in response to an uplink communication to the network node, reception of a medium access control control element in response to the uplink communication to the network node, or reception of a radio resource control reconfiguration complete message from the network node.

20. The UE of claim 1, wherein the one or more processors, to cause the UE to receive the configuration information, are configured to cause the UE to receive a radio resource control communication that includes the configuration information.

21. The UE of claim 1, wherein the source cell comprises a special cell.

22. A network node for wireless communication, comprising:

one or more memories; and one or more processors, coupled to the one or more memories, which are configured, individually or in any combination, to cause the network node to:

transmit configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell; and receive an RLF indication based on the set of LTM-based RLF conditions, wherein a timer is activated based on at least one condition of the set of LTM-based RLF conditions being satisfied.

23. The network node of claim 22, wherein the configuration information indicates a radio link monitoring (RLM) configuration for performing an RLM operation associated with the group of candidate cells.

24. The network node of claim 22, wherein the one or more processors, to cause the network node to receive the RLF indication, are configured to cause the network node to receive the RLF indication based on the set of LTM-based RLF conditions being satisfied, wherein the set of LTM-based RLF conditions are satisfied based on satisfaction of the at least one condition by the source cell and each candidate cell of the group of candidate cells.

25. The network node of claim 24, wherein the set of LTM-based RLF conditions are satisfied based on:

the source cell satisfying the at least one condition; and each candidate cell of the group of candidate cells satisfying a channel quality condition.

26. The network node of claim 22, wherein the one or more processors, to cause the network node to receive the RLF indication, are configured to cause the network node to receive the RLF indication based on an expiration of the timer occurring prior to completion of a successful cell handover to a target cell, and wherein the one or more processors are further configured to cause the network node to perform a reestablishment operation based on the expiration of the timer occurring prior to the completion of the successful cell handover.

27. A method of wireless communication performed by a user equipment (UE), comprising:

receiving configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell; and performing an RLF operation based on the set of LTM-based RLF conditions, wherein a timer is activated based on at least one condition of the set of LTM-based RLF conditions being satisfied.

28. The method of claim 27, wherein the configuration information indicates a radio link monitoring (RLM) configuration for performing an RLM operation associated with the group of candidate cells.

29. A method of wireless communication performed by a network node, comprising:

transmitting configuration information corresponding to a lower layer triggered mobility (LTM) operation associated with an LTM configured cell set, the configuration information indicating a group of candidate cells, of the LTM configured cell set, corresponding to a set of LTM-based radio link failure (RLF) conditions for declaring an RLF associated with a source cell; and receiving an RLF indication based on the set of LTM-based RLF conditions, wherein a timer is activated based on at least one condition of the set of LTM-based RLF conditions being satisfied.

30. The method of claim 29, wherein the configuration information indicates a radio link monitoring (RLM) configuration for performing an RLM operation associated with the group of candidate cells.

* * * * *